United States Patent
Boni

(10) Patent No.: US 10,832,141 B2
(45) Date of Patent: Nov. 10, 2020

(54) EXTRACT TIMEOUT CORE OF A CONSTRAINT SATISFACTION PROBLEM

(71) Applicant: International Business Machines Corporation, Armonk, NY (US)

(72) Inventor: Odellia Boni, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 15/408,459

(22) Filed: Jan. 18, 2017

(65) Prior Publication Data

US 2018/0204122 A1    Jul. 19, 2018

(51) Int. Cl.
*G06N 5/00*        (2006.01)

(52) U.S. Cl.
CPC .................................... *G06N 5/003* (2013.01)

(58) Field of Classification Search
CPC .............................. G06N 5/003; G06N 20/00
See application file for complete search history.

(56) References Cited

PUBLICATIONS

Liffiton, M., et al., "Algorithms for Computing Minimal Unsatisfiable Subsets of Constraints", 2008, J Autom Reasoning (2008) 40:1-33 (Year: 2008).*
Hennery, F., et al., "Extracting MUCs from Constraint Networks", 2006, ECAI 2006: 17th European Conference on Artificial Intelligence, Aug. 2006 (Year: 2006).*
Gregoire, E., et al., "On Finding Minimally Unsatisfiable Cores of CSPs", 2008, International Journal on Artificial Intelligence Tools (IJAIT), 2008, 17 (4), pp. 745-763. (Year: 2008).*
Drescher, C., "The Partner Units Problem a Constraint Programming Case Study", 2012, IEEE 24th International Conference on Tools with Artificial Intelligence, Athens, Greece, Nov. 7-9, 2012 (Year: 2012).*
Shcherbina, O., et al., "Benchmarking Global Optimization and Constraint Satisfaction Codes", 2003, International Workshop on Global Optimization and Constraint Satisfaction, COCOS 2002: Global Optimization and Constraint Satisfaction pp. 211-222 (Year: 2003).*
Gershman, Roman, Maya Koifman, and Ofer Strichman. "An approach for extracting a small unsatisfiable core." Formal Methods in System Design 33.1-3 (2008): 1-27. (Year: 2008).*

(Continued)

*Primary Examiner* — Eric Nilsson
(74) *Attorney, Agent, or Firm* — Dvir Gassner

(57) ABSTRACT

A computerized method comprising using hardware processors for receiving a constraint satisfaction problem (CSP) from a constraint solver system that previously reached a timeout error. The CSP comprises two or more constraints. The hardware processor(s) are used for determining one or more timeout cores of constraints by iteratively removing some test constraints from the CSP thereby forming a sub-problem, and solving the sub-problem using the constraint solver system. When the constraint solver system determines that the sub-problem is solvable the test constraints are added to the timeout cores and the test constraint returning to the CSP, otherwise the sub-problem is assigned as the CSP for the subsequent iteration. The timeout cores are sent to a user terminal for presentation to a user, and receiving a user input to resolve the timeout error of the CSP.

20 Claims, 3 Drawing Sheets

(56) References Cited

PUBLICATIONS

Bjorner, Nikolaj, and Nina Narodytska. "Maximum satisfiability using cores and correction sets." Twenty-Fourth International Joint Conference on Artificial Intelligence. 2015. (Year: 2015).*

Santiago Macho González et al., "Boosting MUS Extraction", SARA'07 Proceedings of the 7th International conference on Abstraction, reformulation, and approximation, Jul. 18, 2007, 285-299, Springer-Verlag Berlin, Heidelberg.

Eric Gregoire et al., "On Finding Minimally Unsatisable Cores of CSPs", International Journal on Artificial Intelligence Tools, Apr. 13 2008, World Scientific Publishing Company.

* cited by examiner

EXTRACT TIMEOUT CORE OF A CONSTRAINT SATISFACTION PROBLEM

BACKGROUND

The invention relates to the field of constraint satisfaction problems.

Constraint satisfaction problems (CSPs) may be generally described as a set of objects whose state must satisfy a number of constraints or limitations. CSPs represent the objects and constraints as a finite collection of constraints over variables which may be solved by constraint satisfaction methods, such as variants of backtracking, constraint propagation, local search, and the like. Solving CSPs may require a combination of heuristics and search methods.

Based on the specific details of a particular CSP, the CSP may be determined to be satisfiable or unsatisfiable. When satisfiable, one or more sets of values assigned to variables that satisfy all constraints of the CSP exist. When unsatisfiable, there are no sets of values assigned to variables that can satisfy all the CSP constraints, and an unsatisfiable core may be determined that defines a reduced set of constraints that cannot be satisfied.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with some embodiments, a computerized method comprising using one or more hardware processors for receiving a constraint satisfaction problem (CSP) from a constraint solver system that previously reached a timeout error during a computation of a solution to the CSP, where the CSP comprises two or more constraints. The hardware processor(s) are used for determining one or more timeout cores of constraints by iteratively removing some test constraints from the CSP thereby forming a sub-problem, and solving the sub-problem using the constraint solver system. When the constraint solver system determines that the sub-problem is satisfiable the test constraints are added to the timeout cores and the test constraint returning to the CSP. When the constraint solver system determines that the sub-problem reaches a sub-problem timeout error, the sub-problem is assigned as the CSP for the subsequent iteration. The hardware processor(s) are used for sending the timeout cores to a user terminal for presentation to a user, and receiving a user input to resolve the timeout error of the CSP.

Optionally, the method further comprises determining an unsatisfiable core by determining that the sub-problem is unsatisfiable and wherein the CSP is unsatisfiable.

Optionally, the method further comprises removing one or more marginal constraints from the CSP prior to determining the timeout cores.

Optionally, the CSP comprises fundamental constraints that are not removed from the CSP to determine the timeout cores.

Optionally, the timeout cores comprise some of the fundamental constraints.

Optionally, the timeout value is dynamically updated after every iteration. The timeout value may be implicitly or explicitly determined.

Optionally, the timeout value is partitioned to each sub-problem solution, and where the timeout value is reduced for each iteration resulting in a solvable sub-problem according to the solution time of the solvable sub-problem.

Optionally, the method further comprises testing that the timeout cores produce a timeout error during one or more iterations.

There is provided, in accordance with some embodiments, a computer program product, the computer program product comprising a non-transitory computer-readable storage medium having program code embodied therewith, the program code executable by one or more hardware processors for executing embodiments of the methods described herein.

There is provided, in accordance with some embodiments, a computerized system adapted to execute embodiments of the methods described herein.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
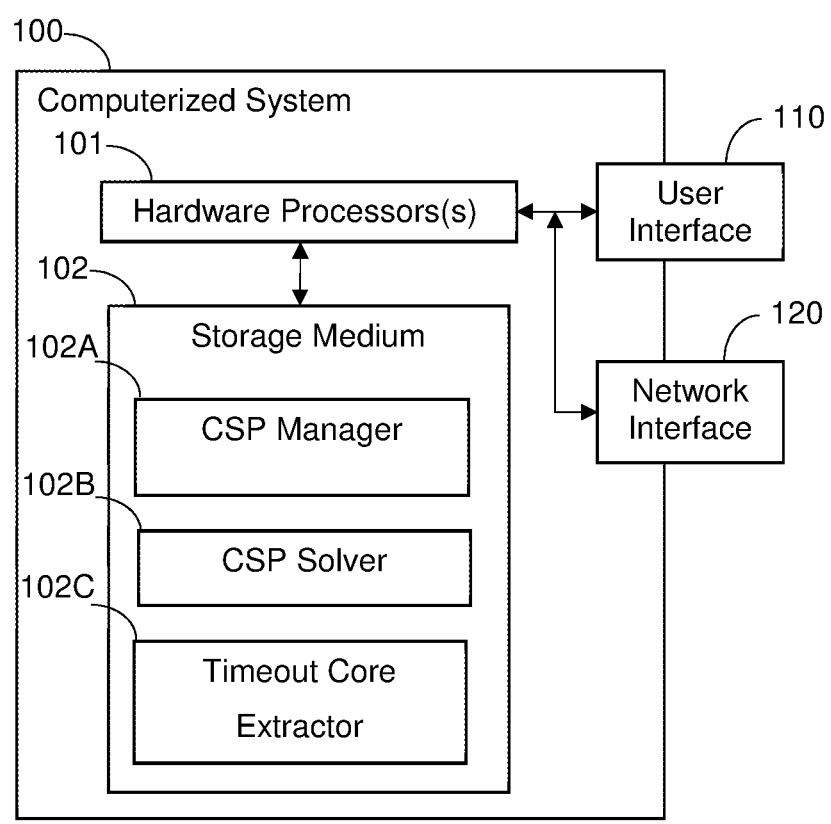
FIG. 1 shows a schematic illustration of a computerized system for analyzing a constraint satisfaction problem with failure due to unsatisfiablity or timing-out.

Described herein are computer methods, systems, and products for resolving timed-out constraint satisfaction problems (CSPs). Timed-out CSPs are CSPs that have not been determined to be satisfiable nor unsatisfiable because of a timeout error during the search for value sets that satisfy the particular CSP. Timed-out CSPs may be also considered unknown, indefinite, obscure, indistinct, indistinguishable, indiscernible, unclear, undecided, unresolved, uncertain, indeterminate, undetermined, un-pellucid, or the like, such as CSPs that have not received a complete and/or definitive classification as satisfiable or unsatisfiable. A Timed-out CSP is received by hardware processor(s) on a computer executing the method, and individual constraints and/or groups of constraints are iteratively removed from the Timed-out CSP to find a timeout core. The timeout core is the set of constraints, such as a subset of the Timed-out CSP, which contains the constraints that cause the Timed-out CSP to timeout. The timeout core is presented to a user for review, and adjustment by the user of one or more constraints of the timeout core to convert the Timed-out CSP to a solvable CSP, and thereby determine the CSP to be satisfiable or unsatisfiable. Optionally, the solver is improved by better propagation, solving heuristics, and the like.

Boolean satisfiability problems (SAT), the satisfiability modulo theories (SMT), answer set programming (ASP), mathematical programming, rule-based optimizations, linear programming, constraints optimization problems, linear optimization, constraint programming and the like may be considered forms of CSPs, and the methods described herein may be applicable. The techniques described herein may be applicable to these fields and other fields that may be modelled as a set of constraints, and which reach a timeout failure during the search for a solution.

Following is an application example to a product, such as a car, software, and the like, that is assembled of several parts. Some parts are mandatory, and some parts are optional. Each part may have attributes, such as number of connections, version number, and the like, and each part may have requirements from various resources, such as cost, volume, weight, memory, and the like. A CSP may comprise constraints, such as fundamental, marginal, and the like, on the combinations of parts and their attributes, such as when the car has a sun-roof, the seat upholstery should not be a leather material, when the tire diameter is less than 50 cm the car length should be less than 3 meters, and the like. In addition, the total resources may be limited, such as price/weight should not exceed a given limit.

A user may select, perhaps partially, a configuration of parts and their attributes, and stores the configuration as a CSP to be solved, thereby determining a satisfiable result of the CSP, such as a valid configuration.

If the solver times out, the user cannot decide whether the given partial configuration can be extended to a valid one or not. When the number of constraints is large, and/or the constraints are intricate, it is beneficial to automatically extract a small subset of constraints that causes the timeout (called a timeout core), and correct these constraints or their handling in the solver, to get a decidable problem.

Care should be taken in differentiating the timeout core and the unsatisfiable core. The timeout core is the set of constraints that causes the Timed-out CSP to timeout (the CSP itself may be satisfiable or unsatisfiable) and the unsatisfiable core is an unsatisfiable subset of constraints of an unsatisfiable CSP. Following are examples of CSPs and the possible solver outputs for them to exemplify the cases in which timeout occurs in a search-base constraints solver.

Consider the (sub)problem:
Constraint 1: $a=b$
Constraint 2: $c=d$
Constraint 3: $a<c$
Constraint 4: $b>d$
Domain: $a,b,c,d \in [1,10]$ This problem is unsatisfiable since $a<c=d<b=a$. If the search route is chosen wisely and the timeout threshold is high enough, a solver may be able to exhaustively search all possible value combinations and determine that the problem is unsatisfiable.

However, when a timeout threshold is short, a solver may not able to exhaustively search all possible value combinations and determine that the problem has failed due to a timeout (no solution found within the timeout threshold).

Now consider the problem:
Constraint 1: $a=b$
Constraint 2: $c=d$
Constraint 3: $c \leq a*b$
Constraint 4: $d \geq a*b$
Domain: $a,b \in [1,10]$ and $c,d \in [10,20]$ This problem is satisfiable with the single solution $a=b=4$ and $c=d=16$. If the search route is chosen wisely and the timeout threshold is high enough, a solver may be able to find the single solution, and determine the problem is satisfiable.

When the timeout threshold is short, a solver may not able to search enough possible value combinations to find the single solution, and determines that the problem has failed due to a timeout.

A timeout core is automatically found by selectively removing constraints individually or in groups from the Timed-out CSP, such as removing iteratively, one-by-one, and the like, and automatically determining the solvability of the remaining CSP. For example, when a timeout error occurs during solving of the remaining CSP, the remaining CSP is considered to comprise at least one timeout core. When solving remaining CSP a timeout does not occur, i.e. determined to be satisfiable or unsatisfiable without a timeout, the removed constraint is part of the timeout core, when the remaining CSP is satisfiable. When the remaining CSP is unsatisfiable, the original CSP is unsatisfiable and the method may extract an unsatisfiable core.

Digital input data received defines the CSP, such as a set of variables, domains (optional values of variables), and constraints, where each constraint is a subset of k variables and a definition of allowed value tuples, such as relations between them. The relations may be in the form of functions, tables, logical relations, allowed combinations, and/or the like. The input data defines the problem, denoted p, and may include additional information such as the timeout value, whether the problem has been determined to be unsatisfiable, the number of retries to perform, search heuristics, and the like.

Optionally, constraints in the CSP that are not fundamental and are not part of the constraints to be checked for timeout, such as marginal constraints, are removed from the problem before searching for a timeout core. The marginal constraints are constraints that are not central to a problem and not considered to affect the timeout error, and may be determined automatically, semi-automatically, or manually by a user. For example, constraints are removed automatically by a list of predetermined constraints.

The fundamental constraints are constraints that are central to the problem, included in any solving of the full or partial CSP, such as a subset CSP, and preserve the essence of the problem. For example, in the configuration problem described above, physical limitation constraints, and the like, may be considered fundamental (since they cannot be fixed/altered nor ignored), price constraints or color constraints may be considered marginal (since they are not essential to the configuration problem), and mechanical configuration constraints are the constraints to be tested, since we are interested in configuration mismatches.

Reference is now made to FIG. 1, which is a schematic illustration of a computerized system 100 for solving a timed-out constraint satisfaction problem. System 100 comprises one or more hardware processors 101, a storage medium 102, a user interface 110, a network interface 120, and/or the like. Storage medium 201 may have encoded thereon program code of processor instructions for execution on hardware processor(s) 101. The processor instructions include a CSP Manager 102A, a CSP Solver 102B, and a Timeout Core Extractor 102C, where each set of processor instructions, when executed on hardware processor(s) 101, causes hardware processor(s) 101 to perform steps of the methods as described herein. This configuration of program code modules will be referred to as modules adapted to perform the steps of the methods.

For example, CSP Manager 102A is adapted to receive a CSP, evaluate fundamental constraints, extract constraints to test, and the like. For example, fundamental constraints are determined by a user. For example, the CSP Manager 102A receives and manages information on the given CSP: cause of failure (unsatisfiable or timed-out), the constraint classes (fundamental/test/marginal), solving heuristics used, last failed constraint, a strategy for choosing next constraint to check and the like. For example, CSP Solver 102B is adapted to solve a CSP or subset of a CSP, such as determining if the CSP is satisfiable, unsatisfiable, causes a timeout error, or the like. A Timeout Core Extractor 102C may be adapted to iteratively and/or selectively remove constraints from the problem, send the sub-problem to CSP Solver 102B, and once a timeout core is identified, send the timeout core to a user interface for presentation to a user and further handling to resolve the CSP timeout error.

Figure 2:
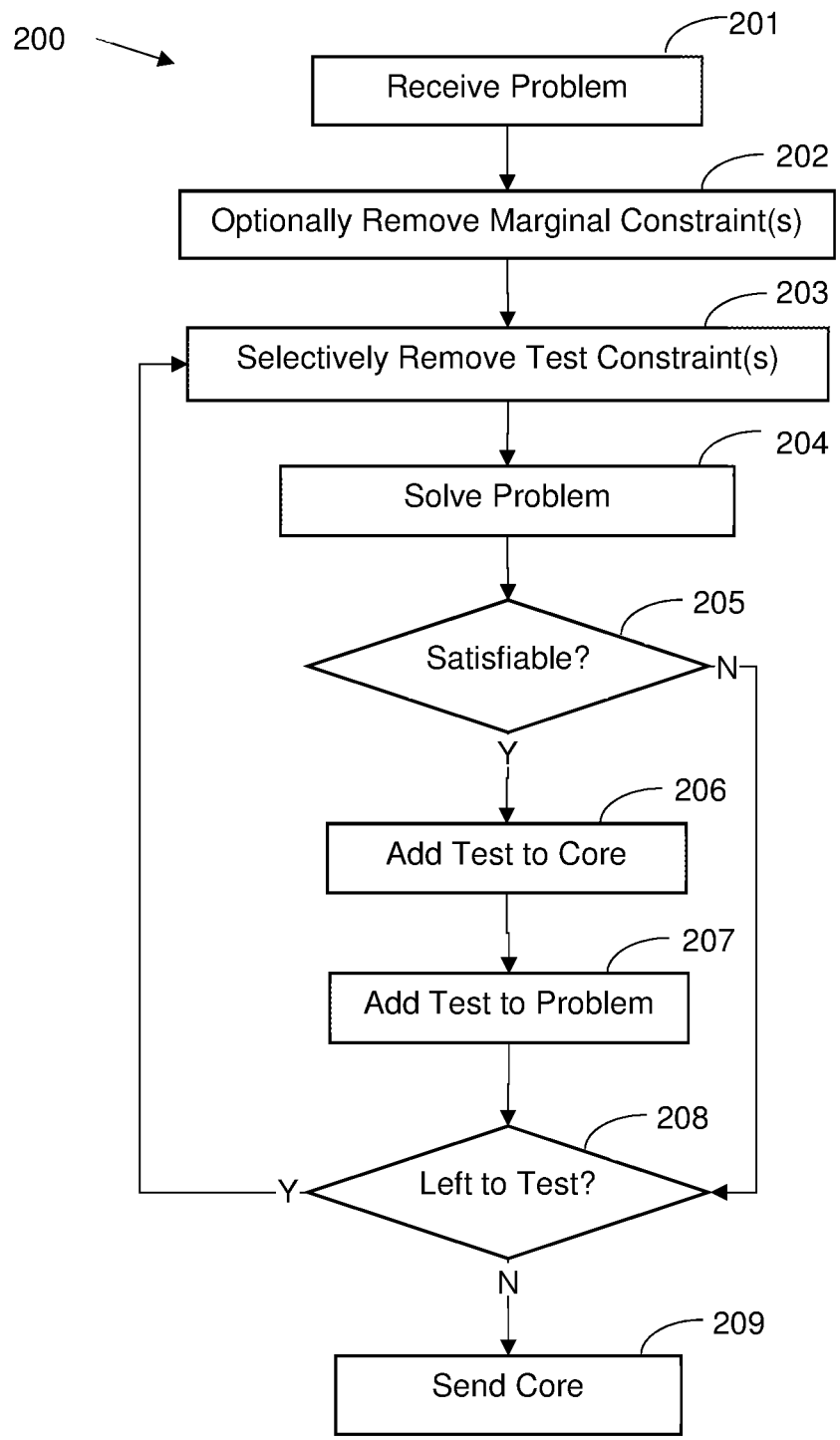
FIG. 2 shows a flowchart of a method for analyzing a constraint satisfaction problem with failure due to unsatisfiablity or timing-out.

Reference is now made to FIG. 2, which is a flowchart of a method 200 for solving a timed-out constraint satisfaction problem. A CSP is received 201 and optionally marginal constraints are removed 202. An iterative process selectively removes 203 one or more test relations, and tries to solve 204 the remaining sub-problem. When the sub-problem is solved 205, the removed test relations are added 206 to the timeout core and to the sub-problem for determining further relations that might belong to the timeout core. When the sub-problem is solved 205 the problem is evaluated to determine if there are any remaining relations left to test 208, and if not sends 209 the timeout core to a user interface to present to the user for manual resolution of the constraints that are causing the timeout error. If the sub-problem is unsatisfiable or times-out, the tested constraints are not part of the core and are removed.

Figure 3:
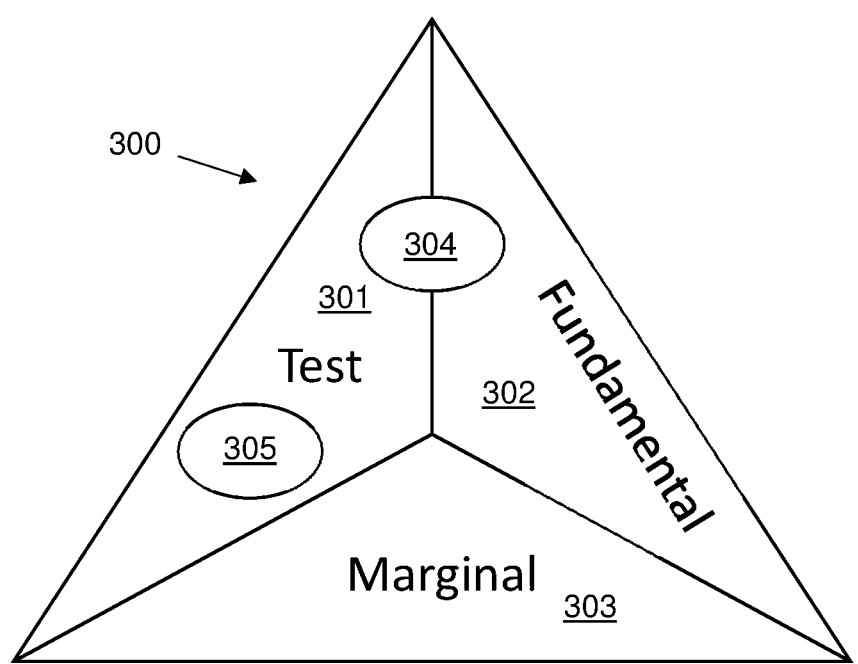
FIG. 3 shows a schematic illustration of constraint classes of a constraint satisfaction problem and the core types that the described method can extract.

Reference is now made to FIG. 3, which is a schematic illustration of a constraint satisfaction problem 300 including timeout cores. This schematic illustration shows the arrangement of the fundamental relations 302 in the CSP 300. For example, fundamental relations 302 contain constraints that may be inherent and should be included in all solutions, such as always active, but might or might not contain the timeout core. The marginal constraints 303 may be optionally removed from the timeout core identification methods. For example, some relations do not contribute to the failure or we are not interested in causes for failure that involve them. The test relations 301 are the constraints that may be causing the timeout error, and where a timeout core 305 may be located. Alternatively, a timeout core 304 may be located within both the test 301 and fundamental relations 302. Optionally, CSP 300 may contain multiple timeout cores such as at 304, 305, and the like.

Optionally, constraints for testing may be ordered statically, such as once at the beginning of the process. Optionally, constraints for testing may be ordered dynamically, such that after each test constraint checking, the next constraint/group of constraints to be checked is determined.

Optionally, a group of constraints is tested in a single removal. For example, this option may be useful when a group of constraints covers a single "feature", such as $a \geq b$, $b \geq c$, and $c \geq d$ to describe ordering constraint on variables a, b, c and d ($a \geq b \geq c \geq d$). Testing a group of constraints in a single removal may enhance performance but may lose minimality of the core. A minimal core may be a set of constraints in which removing any constraint from the set renders it satisfiable (no longer unsatisfiable or timed-out). For example, when testing removal of all 4 constraints in the example above in a single removal, when the remaining sub-problem is solved, all 4 constraints are included in the extracted core while if each of the constraints was to be tested separately, may be only the constraint $b \geq c$ would have been included in the core.

When the CSP solver has some integral randomness and employs a timeout threshold, several retries may be more beneficial to determine the solvability of the problem. For example, many of the prominent algorithms for solving CSPs may be search based. Choosing the search direction/subtree may be deterministic or random. For random choices, each try may produce different results. If a certain problem timed-out in a certain try, another retry may result in finding a solution or proving unsatisfiability, thus improving the results (performance and accuracy). Usually, a threshold for the number of retries is set in the solver.

Optionally, a number of retries for each iteration is received and the CSP solver has some randomness incorporated into the solving procedure.

Optionally, some user knowledge is incorporated into the process of determining the timeout core. For example, a user specifies the order with which the constraints are tested. For example, a user specifies groups of constraints to be tested. For example, a user specifies a pre-classifying of constraints into ones that are definitely in the timeout core, definitely not in the timeout core (marginal constraints), and constraints that should be tested (test constraints). Fundamental constraints may not be tested, but also may not be omitted from the problem search. Therefore, fundamental constraints may be included in the core, but may not be presented as part of the core.

The methods, products and systems described here are useful for debugging CSPs, improving CSP models, testing CSP solvers, and the like. For a timed-out CSP, a timeout core may point out a constraint or combination of constraints that are difficult to find a solution that satisfies them since, for example their propagation is inefficient. This may lead to remodeling the CSP using different, more efficient constraints, or improving the solver's propagation algorithms for these constraints. The user may also choose to strengthen or relax some of the constraints and the solver designer may choose to change the search heuristics used to solve the problem.

For example, for cases in which the timeout error is caused by constraints that contradict each other. Contradicting constraints may be a set of constraints that cannot be satisfied by any possible assignment of values to the variables (i.e. solution). When the domains of the variables participating in the contradictions are very large, and/or the propagators of the constraints are not sufficient, the solver will timeout. The user may resolve this timeout by changing the constraints/domains (to prevent contradiction) or by improving the propagators/search heuristics to reach the unsatisfiability conclusion before timeout occurs.

Optionally, a user interface is used to present the timeout core and receive further user input into changes to be made to the CSP to resolve the timeout error, such as a change in the domains, constraints, variables, and the like. For example, a use case may be finding inconsistencies in a model. For example, a use case may be reformulating a model to one that is solved more quickly. For example, a use case may be to identify bottlenecks in propagation and/or search heuristics and thus improve performance.

This disclosure describes determining a timeout core, analogous to an unsatisfiable core, to resolve CSP that have timed-out when solved, and therefore cannot be determined to be satisfiable nor unsatisfiable. For example, the following pseudocode determines a core, shown in two distinct scenarios here (a problem that is known to be unsatisfiable verses a problem that timed-out and we cannot determine whether it is satisfiable or not):

```
If solve(p-Ri) = timed-out: core<-Ri
If solve(inCore)=timed-out: return core
If some sub-problem is unsatisfiable, treat problem as unsatisfiable.
and:
If solve(p-Ri)=unsatisfiable: inCore<-Ri
If solve(p-Ri)=timed-out: mayBeInCore<-Ri
If solve(inCore U mayBeInCore)=timed-out: continue
```

Following is an example pseudocode with more detail for determining timeout core:

```
Get core( set of constraints p, bool surelyUnsat, int timeout, int nRetries)
{
inUnsat = GetFundemental( ) // "fundamental" constraints
R = OrderConstraintsToCheck(p->GetConstraintsToCheck( )) // Get test constraints
N=R.size( )
notInUnsat = p\ [without] (inUnsat U R) // ignore rest of constraints (marginal)
maybeInUnsat = empty_set
while (! R.empty) { // there are constraints to check
   Ri=R.GetNextConstraintToCheck( ) // dynamically ordering of test constraint
                                   // (may return a constraint set)
   res=Solve(p\ (Ri U notInUnsat), timeout/2N, nRetries, solveTime) // solve sub-problem
                                                                   //without checked constraint
   if (res=unsatisfiable) : notInUnsat <- Ri , surelyUnsat = true
   else if (res=satisfiable) : inUnsat <-Ri
   else : // sub-problem timed-out
      if (surelyUnsat) : maybeInUnsat <-Ri else inUnsat<-Ri
   if IsCompleteCore(inUnsat U MaybeInUnsat, surely Unsat, timeout/2N, nRetries,
solveTime1) : return // done
   timeout = timeout-solveTime-solveTime1 // update timing
   R.remove(Ri)
   }
}
// EveryTime inUnsat or maybeInUnsatCore are updated,
// invoke IsCompleteCore ( ) to check if the detected conflict is full
IsCompleteCore(set of constraints currentlyInCore, bool surely Unsat, int timeout, int
nRetries, int solveTime1)
{
res=Solve(currentlyInCore, timeout/2N,nRetries, solveTime1)
If (res=satisfiable): return false
Else if (res=unsatisfiable): return true
Else : // sub-problem timed out
      if (surelyUnsat): return false
      else return true
}
```

Following is an example of extracting unsatisfiable core of an unsatisfiable CSP, such as described by Bakker et al in "Diagnosing and Solving Over-Determined Constraint Satisfaction Problems", published in the Proceedings of the International Joint Conference on Artificial Intelligence 1993, pages: 276-281. For each constraint of the unsatisfiable CSP, check to solve the CSP without the constraint. When the resulting sub-problem is unsatisfiable, then omit the constraint from the problem. At the end of the process, the remaining sub-problem is an unsatisfiable core of the original problem.

This technique assumes a CSP solver can always determine whether a given set of constraints is satisfiable or unsatisfiable, meaning cases where the solver times out are not considered. For example, in the paper above, a problem/sub-problem that times-out is treated as unsatisfiable, which may mean the unsatisfiable core found may not be a true core. Moreover, the problem itself may be actually satisfiable.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized method comprising using at least one hardware processor for:
   receiving a constraint satisfaction problem (CSP) that previously reached a timeout error during a computation of a solution to the CSP, wherein it is not known whether the CSP would have been satisfiable absent a timeout threshold that caused the timeout error, and wherein the CSP comprises a plurality of constraints;
   determining at least one timeout core of constraints by iteratively:
      (a) removing some test constraints from the CSP thereby forming a sub-problem,
      (b) solving the sub-problem using a constraint solver system,
      (c) when the constraint solver system determines that the sub-problem is satisfiable, the test constraints are added to the at least one timeout core and are returned to the CSP for the subsequent iteration, and
      (d) when the constraint solver system determines that the sub-problem reaches a sub-problem timeout error, the sub-problem is assigned as the CSP for the subsequent iteration; and
   sending the at least one timeout core to a user terminal, for:
      (i) presentation to the user, and
      (ii) receiving input from the user to resolve the timeout error of the CSP.

2. The method according to claim 1, further comprising removing one or more marginal constraints from the CSP prior to determining the at least one timeout core.

3. The method according to claim 1, wherein the CSP comprises fundamental constraints that are not removed from the CSP to determine the at least one timeout core.

4. The method according to claim 3, wherein the at least one timeout core comprises some of the fundamental constraints.

5. The method according to claim 1, further comprising determining an unsatisfiable core by determining that the sub-problem is unsatisfiable and wherein the CSP is unsatisfiable.

6. The method according to claim 1, further comprising distinguishing between unsatisfiable core constraints which are surely in the at least one timeout core, and unsatisfiable core constraints that may belong to the at least one timeout core.

7. The method according to claim 1, further comprising receiving a timeout value, wherein the timeout value is reduced after each iteration according to a computation time of the sub-problem in the respective iteration.

8. The method according to claim 1, wherein the iterations are completed when no test constraints can be removed from the at least one timeout core without the constraint solver system determining that the sub-problem represented by the at least one timeout core is solvable.

9. The method according to claim 1, wherein, in said determining of the at least one timeout core, the at least one timeout core is determined regardless of whether it forms a satisfiable CSP or an unsatisfiable CSP.

10. The method according to claim 1, further comprising resolving the timeout error of the CSP based on the determined at least one timeout core and on the input received from the user, by performing at least one of following actions:
    changing at least one of the constraints of the timeout core;
    strengthening or relaxing at least one of the constraints of the timeout core;
    improving a propagation algorithm used in the further computation; and
    narrowing a domain of variables in at least one of the constraints of the timeout core.

11. A computer program product, the computer program product comprising a non-transitory computer-readable storage medium having program code embodied therewith, the program code executable by at least one hardware processor for:
    receiving a constraint satisfaction problem (CSP) that previously reached a timeout error during a computation of a solution to the CSP, wherein it is not known whether the CSP would have been satisfiable absent a timeout threshold that caused the timeout error, and wherein the CSP comprises a plurality of constraints;
    determining at least one timeout core of constraints by iteratively:
      (a) removing some test constraints from the CSP thereby forming a sub-problem,
      (b) solving the sub-problem using a constraint solver system,
      (c) when the constraint solver system determines that the sub-problem is solvable the test constraints are added to the at least one timeout core and are returned to the CSP for the subsequent iteration, and
      (d) when the constraint solver system determines that the sub-problem reaches a sub-problem timeout error, the sub-problem is assigned as the CSP for the subsequent iteration; and
    sending the at least one timeout core to a user terminal, for:
      (i) presentation to the user, and
      (ii) receiving input from the user to resolve the timeout error of the CSP.

12. The computer program product according to claim 11, wherein the program code is further executable for removing one or more marginal constraints from the CSP prior to determining the at least one timeout core.

13. The computer program product according to claim 11, wherein the CSP comprises fundamental constraints that are not removed from the CSP to determine the at least one timeout core.

14. The computer program product according to claim 11, wherein the program code is further executable for receiving a timeout value, wherein the timeout value is partitioned to each sub-problem solution, and wherein the timeout value is reduced for each iteration resulting in the sub-problem timeout error.

15. The computer program product according to claim 11, wherein the program code is further executable for testing that the at least one timeout core produces a timeout error during at least one of the iterations.

16. A computerized system comprising:
    at least one hardware processor;
    a non-transitory computer-readable storage medium having program code embodied therewith, the program code executable by the at least one hardware processor for:
      receiving a constraint satisfaction problem (CSP), that previously reached a timeout error during a computation of a solution to the CSP, wherein it is not known whether the CSP would have been satisfiable absent a timeout threshold that caused the timeout error, and wherein the CSP comprises a plurality of constraints;
      determining at least one timeout core of constraints by iteratively:
        (a) removing some test constraints from the CSP thereby forming a sub-problem,
        (b) solving the sub-problem using a constraint solver system,
        (c) when the constraint solver system determines that the sub-problem is solvable the test constraints are added to the at least one timeout core and the test constraint returning to the CSP, and
        (d) when the constraint solver system determines that the sub-problem reaches a sub-problem timeout error, sub-problem is assigned as the CSP for the subsequent iteration; and
      sending the at least one timeout core to a user terminal for:
        (i) presentation to the user, and
        (ii) receiving input from the user to resolve the timeout error of the CSP.

17. The computerized system according to claim 16, wherein the program code is further executable for removing one or more marginal constraints from the CSP prior to determining the at least one timeout core.

18. The computerized system according to claim 16, wherein the CSP comprises fundamental constraints that are not removed from the CSP to determine the at least one timeout core.

19. The computerized system according to claim 16, wherein the program code is further executable for receiving a timeout value, wherein the timeout value is partitioned to each sub-problem solution, and wherein the timeout value is reduced for each iteration resulting in the sub-problem timeout error.

20. The computerized system according to claim 16, wherein the iterations are completed when no test constraints can be removed without the constraint solver system determining that the sub-problem is solvable.

* * * * *